United States Patent Office 3,332,939
Patented July 25, 1967

3,332,939
ACYLATED LACTAMS
Frederic E. Detoro, Pensacola, Fla., and Paul Kraft, Bloomfield, N.J., assignors to American Cyanamid Company, Stamford, Conn., a corporation of Maine
No Drawing. Original application Dec. 20, 1961, Ser. No. 160,922, now Patent No. 3,206,439, dated Sept. 14, 1965. Divided and this application Dec. 18, 1964, Ser. No. 419,610
2 Claims. (Cl. 260—239.3)

ABSTRACT OF THE DISCLOSURE

This invention is directed to lactams having the formula

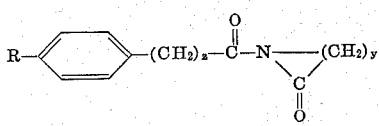

wherein $z$ is an integer of 0–5, $y$ is an integer of 4–9 and R is an $NH_3$ or $NO_2$ radical.

This application is a division application of our copending application, Ser. No. 160,922, filed Dec. 20, 1961, now U.S. Patent No. 3,206,439.

The present invention relates to a process for the production of novel aromatic amino acids. Additionally, the instant invention relates to novel aromatic amino acids, to the intermediates formed during the production of these acids and to the polymers of these acids. Further, the present invention relates to a process for the production of novel aromatic amino acids which comprises reacting an aromatic nitro acid halide with an aliphatic amino acid and then forming the aromatic amino acid by reducing the nitro group of the novel nitro acid intermediate. Still further, the present invention relates to a process for the production of novel aromatic amino acids which comprises reacting an aromatic nitro acid halide with a lactam and then forming the aromatic amino acid by reducing the nitro group and hydrolyzing the lactam ring of the novel acylated lactam intermediate. Still further, this invention relates to a process for the preparation of ordered polymers of novel aromatic amino acids.

It is an object of the present invention to set forth a process for the preparation of monomers which are suitable for polymerization to polymers of ordered structure. It is another object of the present invention to prepare various novel compounds which are suitable as intermediates in the production of novel aromatic amino acids from which ordered polymers may be produced. These and other objects of the present invention will become apparent to one skilled in the art upon reading the more detailed description presented hereinbelow.

The copolymerization of aromatic nitro acid halides with aliphatic amino acids usually results in the production of a "random" copolymer. That is to say, if the acid halide is designated as A, and the amino acid is designated as B, a random copolymer will be produced when the two are copolymerized, i.e. one in which the components A and B are incorporated in random fashion, e.g. —ABAAABBABBB— etc.

However, according to our invention, a novel monomer, AB, is first produced by reacting the aromatic nitro acid halide, A, with the aliphatic amino acid, B, under certain conditions. This novel aromatic amino acid, AB, may then be homopolymerized to form a novel so-called, "ordered" polymer which has the components, A and B, incorporated in ordered fashion, e.g. —ABABABAB— etc. This ordered polymer has many advantages over the random type of copolymer, mentioned above, especially in respect to the production of fibers therefrom.

Generally, fibers have numerous physical and chemical properties which will either enhance or discredit their commercial applications. The most important of these properties are those of tenacity, initial modulus, compliance, work recovery, stability to hot and cold water, stability to common solvents and stability to weakly acidic or alkaline media. Equally important in the condensation polymer area, are the thermal properties exhibited by the polymer and fiber. In general, it is desirable to have a polymer with a reasonably high melting point since polymers, possessing high melting points, are relatively stable and more easily handled in the molten state and can thus be extruded into fine filaments.

Although high melting polymers are desirable they often present difficulties due to thermal decomposition during and after melting. However, when polymers have a desirable high melting point, desirable characteristics such as high fiber stick and deformation temperatures usually result when the polymers are extruded into fibers. High melting polymers which combine high fiber stick and deformation temperatures and low thermal decomposition are somewhat rare and the industry is continually on the outlook for polymers exhibiting such properties.

We have found that the properties of polymers of the novel aromatic amino acids of the present invention are highly desirable for numerous textile and industrial applications since they are high melting compounds which possess excellent properties in regard to initial moduli, compliance, fiber stick and deformation temperatures while exhibiting low thermal decomposition during and after melting.

The "ordering" of the basic structural units of polymers of the novel aromatic amino acids of the present invention, as mentioned above, is believed to lead to the significant changes in the thermal properties of the present polymer as compared to the corresponding random polymers of the same aromatic nitro acid halides and aliphatic amino acids used to prepare the novel aromatic amino acids of the present invention. Melting points of from about 165° C. to about 260° C. higher than those of the random polymers are obtained. These ordered polymers are therefore more desirable for commercial use in the form of fibers, for example, than the polymers produced from the random polymers in respect to the desired properties disclosed above.

Although there is more than one novel group of compounds disclosed and claimed herein, the compounds to which the present invention is most specifically directed are the novel aromatic amino acids, i.e. those which are represented by the general formula (I)

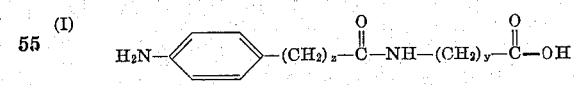

wherein $z$ is a positive whole integer of from 0 to 5, inclusive, and $y$ is a positive whole integer of from 4 to 9, inclusive. These novel aromatic amino acids may be produced in a number of ways, most of which involve further treatment of the various novel intermediates which also constitute a part of the present invention.

One of the methods for producing the novel aromatic amino acids of Formula I comprises reacting an aromatic nitro acid halide having the formula (II)

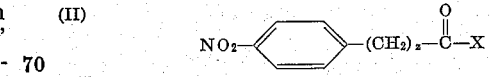

wherein $z$ is a whole positive integer of from 0 to 5, inclusive, and X is a halogen radical, with an aliphatic amino acid having the formula (III)
$$NH_2-(CH_2)_y-\overset{O}{\underset{\|}{C}}-OH$$

wherein y is a positive whole integer of from 4 to 9, inclusive.

The reaction of these aliphatic amino acids with the aromatic nitro acid halides may be carried out according to the procedure set forth by Robert E. Steiger in "Benzoylation of Amino Acids," Journal of Organic Chemistry, volume 9, pages 396 to 400, 1944. The reaction is of the Schotten-Baumann type and is carried out at temperatures of from about $-30°$ C. to $+30°$ C., preferably $-10°$ C. to $+10°$ C., and in the presence of an acid acceptor. The acid acceptor is employed in order to take up the acid given off by the reaction and usually is a dilute solution of an inorganic basic material with sodium hydroxide, potassium hydroxide and the like, being exemplary.

Generally, and preferably, the reaction is carried out utilizing a molar ratio of aromatic nitro acid halide to aliphatic amino acid of 1:1, respectively. Additionally, it is possible to use an excess of either compound. However, the use of an excess of either compound results in the production of undesirable side-reaction necessitating costly purification of the aromatic amino acid product, a difficulty not encountered with an equi-molar ratio reaction.

The reaction is allowed to continue for from about 1 to 8 hours, preferably about 2 to 6 hours, in order to assure a substantially complete reaction. Although atmospheric pressure is preferred, it is possible to use super or subatmospheric pressures if necessary. The reaction is generally carried out in the presence of a solvent for the feed materials which are being reacted. When the acids represented by Formula III are utilized, it is preferred that the same material be used as a solvent which is used as the acid acceptor mentioned above, i.e. dilute sodium hydroxide, dilute potassium hydroxide and the like. This results in a compatible reaction medium and aids materially in the economics of the recovery of the novel aromatic amino acid.

Since the same compound is generally utilized as the solvent and the acid acceptor, the amount of the compound used is governed by the amount of the acid by-product given off. That is to say, enough acid acceptor must be present in order to take up the acid produced. It is therefore generally advisable to utilize a molar equivalent of the acid acceptor-solvent and the aromatic nitro acid halide, with slight excesses of the acid acceptor-solvent being preferred. When the solvent is a different compound than the acid acceptor, amounts sufficient to dissolve the reactants should be used.

Examples of the compounds which may be used in the present invention and which are represented by Formula II, above, include p-nitro benzoyl chloride, p-nitro benzoyl bromide, p-nitro benzoyl fluoride, p-nitro phenyl acetyl chloride, p-nitro phenyl propionyl bromide, p-nitro phenyl butyroyl chloride, p-nitro phenyl pentoyl fluoride, p-nitro phenyl hexoyl iodide and the like.

Examples of compounds represented by Formula III are ω-amino valeric acid, ω-amino caproic acid, ω-amino heptoic acid, ω-amino caprylic acid, ω-amino pelargonic acid, ω-amino capric acid and the like.

The reaction of the compounds of Formulae II and III results in the production of one of the novel intermediate compounds of the present invention. These novel intermediate aromatic nitro acids have the general formula (IV)
$$NO_2-\underset{}{\underset{}{\bigcirc}}-(CH_2)_z-\overset{O}{\underset{\|}{C}}-NH-(CH_2)_y-\overset{O}{\underset{\|}{C}}-OH$$

wherein y and z have the same connotations as set forth above in respect to Formula I.

These intermediates are then converted to the novel aromatic amino acids of Formula I, above, by reducing the nitro group to an amino group.

This reduction reaction is carried out by dissolving the compound of Formula IV above, in a solvent such as ethanol, having dissolved therein a catalyst. The reaction is carried out at a pressure of from about 5 p.s.i.g. to about 100 p.s.i.g., preferably, from about 50 p.s.i.g. to about 80 p.s.i.g., in the presence of hydrogen and at a temperature of from $15°$ C. to $90°$ C., preferably $25°$ C. to $60°$ C. Generally, it is preferred to use a hydrogen concentration of at least 95% of the theoretical $H_2$ possible. In other words, since water is formed during the reaction, it is preferred to use at least 95% of three moles of hydrogen per $-NO_2$, group.

The reaction may be carried out in the presence of a catalyst. Usually a catalyst comprising a noble metal of Group VIII of the Periodic System on a suitable carrier is preferred. Examples of catalysts which may be used in the reduction process are palladium and platinum, and the like on such carriers as carbon, Raney nickel, Raney cobalt, silica, alumina, fuller's earth and the like.

The catalyst concentration is usually from about 0.1% to 3.0%, preferably 0.2% to 1.0%, by weight, based on the weight of the nitro compound. The catalyst concentration expressed above includes only the active portion of the catalyst, i.e. for example, the platinum, and does not include the weight of the carrier present in the catalyst system.

Other solvents which may be used in place of the ethanol expressed above, are the aliphatic alcohols having 1 to 8 carbon atoms, i.e. methanol, propanol, isopropanol, butanol, isobutanol, amyl alcohol, hexyl alcohol, heptyl alcohol, octyl alcohol and the like.

Practically, the amount of solvent necessary is that amount which completely dissolves the reactants involved in the reaction. However, it is possible to use an amount with the range of from about 50% to about 150%, by weight, based on the weight of aromatic nitro acid being reduced.

The above-mentioned method for the reduction of the nitro compound to the amino compound, although preferred, is not the only method which may be utilized. Any known reduction procedure may be employed, such as that indicated by Examples 11 and 12 below. In these examples the reduction is carried out at atmospheric pressure utilizing a ferrous sulfate catalyst. Ammonia is incorporated as the solvent and sodium hydroxide is used in order to effect a basic reaction media. Although this method is more easily carried out than that disclosed above due to the use of atmospheric pressure, it can be seen that the efficiency decreases in regard to percent yield.

A second method for the production of the novel aromatic amino acids of the present invention involves reacting an aromatic nitro acid halide represented by Formula II, above, with a lactam having the general formula (V) 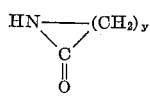

wherein y is a positive whole integer of from 4 to 9.

This reaction may be carried out under conditions similar to those set forth above in regard to the procedure of Steiger. The pressure of the reaction, molar ratio of reactants and time of reaction are the same in both instances. However, in the lactam reaction, the reactants are heated and allowed to react at at least reflux temperature. Generally, ranges of temperature depend upon the boiling point of the solvent employed but ranges of from about $60°$ C. to about $100°$ C., preferably about $65°$ C. to about $80°$ C., usually will be sufficient. Additionally, when the compounds of Formula V are reacted, different solvents must be used than those disclosed above in regard to the compounds of Formula III. Generally, one may use any compound which is a solvent for those compounds represented by Formula V, with such solvents as $CCl_4$, $HCCl_3$ and the like being exemplary. Practically, the amount of solvent used is that which dissolves the reactants charged into the reaction vessel. However, generally, a range of from about 50% to about 150%, by weight, based on the weight of the aromatic nitro acid halide, may be used. The last deviation in the process is that, since reflux temperatures are used, no acid acceptor, as such, need be added since any acid produced as by-product is driven off at the reflux temperature of the reaction. It can be seen therefore, that minor changes in conditions must be made, however, the general mode of the two processes remains the same.

Examples of compounds represented by Formula V include valerolactam, caprolactam, heptolactam, caprylolactam, pelargonolactam, caprilactam and the like.

This second method of the production of the novel aromatic amino acids results in the production of another of the novel intermediate compounds of the present invention. These intermediate compounds are acylated lactams and have the formula (VI) 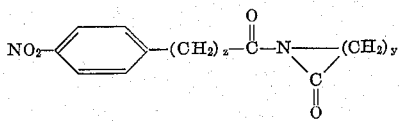

wherein $y$ and $z$ have the same connotations as set forth above in respect to Formula I.

These acylated lactam intermediates may be converted to the novel aromatic amino acids of Formula I by (1) hydrolyzing the lactams to the intermediate aromatic nitro acids of Formula IV and then (2) reducing the aromatic nitro acids as specifically set forth hereinabove.

Step 1 is carried out at temperatures of from about 50° C. to about 175° C., preferably from about 100° C. to about 150° C., and atmospheric pressure. It is possible however, to use superatmospheric or subatmospheric pressures if desired.

The reaction is allowed to continue for from about 30 minutes to 10 hours, preferably 2 to 6 hours, and after the reaction is substantially complete, the resulting reaction mixture may be neutralized with a dilute solution of any known inorganic basic material, of which sodium hydroxide and potassium hydroxide are exemplary. The use of these neutralizers is necessary in view of the fact that an acid catalyst is employed. This acid catalyst is a dilute aqueous solution of a strong inorganic acid, such as hydrochloric acid, sulfuric acid, nitric acid, and the like and is employed as about a 15% to 50% aqueous solution of the acid in amounts ranging from about 5% to 20%, by weight, based on the weight of the lactam undergoing hydrolysis. The neutralization retards any further reaction and results in a solution which can more easily be treated for recovery of the intermediates aromatic nitro acid.

When hydrolyzing and reducing acylated lactams of Formula VI the sequence of Steps 1 and 2 is not critical, that is to say, either the hydrolysis or reduction may be effected first. However, when the amino group is reduced first, intermediate acylated lactams having the formula (VII) 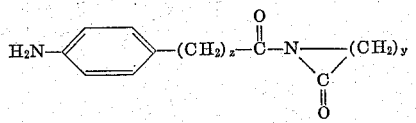

wherein $z$ and $y$ are as defined above with respect to Formula I, are produced. These novel compounds also form part of the present invention. They are then hydrolyzed to the novel aromatic amino acids of Formula I, above, as set forth previously in regard to Step 1.

As indicated above, the novel aromatic amino acids of Formula I of the present invention are polymerizable and when polymerized, form polymers having ordered configuration which can be formed into various articles, e.g., fibers which possess superior properties over those produced from polymers having random configuration. The polymers may also be molded, blended with other polymers or formed into a variety of other compositions useful as laminating resins, coatings, adhesives and the like.

The ordered homopolymers resulting from the polymerization of the polymerizable aromatic amino acids are composed of recurring units of the formula (VIII) 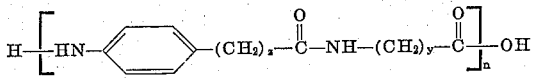

wherein $z$ and $y$ are defined as indicated above in respect to Formula I.

The polymerization of the monomers represented by Formula I is carried out at a temperature of from about 100° C. to about 400° C., preferably 150° C. to 300° C.

The pressure is preferably atmospheric, although superatmospheric or subatmospheric pressures may be used without detracting from the desired properties of the resulting polymer. The process may be carried out in the presence or absence of a solvent. Examples of solvents which may be used, when desired, are m-cresol, phenol and the like. These solvents are generally employed in amounts necessary to dissolve the monomers being polymerized, however, amounts ranging from about 50% to about 150%, by weight, based on the weight of the monomer, may be used. When solution polymerization is employed, the solids content of the polymers produced is about 20% to about 80%, preferably 40% to 55%. However, reaction time is generally within a range of from about 2 hours to about 12 hours, with about 5 hours to about 8 hours being preferred, for both bulk and solution polymerization reactions.

The following examples are by way of illustration only and are not to be construed as limitations of the instant invention except as set forth in the appended claims. All parts and percentages are by weight unless otherwise indicated.

EXAMPLE 1

*Preparation of N[p-nitro benzoyl]-ω-amino valeric acid*

To a suitable reaction vessel equipped with stirrer, thermometer and inlet conduits there are added 117 parts of ω-amino valeric acid, 40 parts of NaOH and 1000 parts of water. The solution is cooled to 0° C. and to this cold mixture are added simultaneously 185 parts of p-nitro benzoyl chloride and a solution of 40 parts of NaOH in 1000 parts of water. The addition of the chloride and additional NaOH takes place over a two hour period. The resulting mixture is then stirred for four hours at room temperature and filtered. The filtrate is acidified with 6 N HCl causing the condensation product of the valeric acid and benzoyl chloride to precipitate. The resulting solution is then filtered and the precipitate is collected and recrystallized from hot water. A yield of 85% of the condensation product is realized.

EXAMPLE 2

*Preparation of N[p-nitro benzoyl]-ω-amino caproic acid*

The procedure of Example 1 is again followed except that in this case ω-amino caproic acid is utilized, in equivalent amounts, in the place of the ω-amino valeric acid. After filtration and recrystallization, 83% of the desired condensation product is recovered.

EXAMPLE 3

*Preparation of N[p-nitrophenylacetyl]-ω-amino caprylic acid*

The procedure of Example 1 is again followed. However, in this instance, ω-amino caprylic acid is utilized, in equivalent amounts in place of the ω-amino valeric acid and p-nitrophenylacetyl iodide is utilized, in equivalent amounts, in place of p-nitro benzoyl chloride. After filtration and recrystallization from hot water, 87% of the desired condensation product is recovered.

EXAMPLE 4

*Preparation of N[p-nitrophenylpropionyl]-ω-amino capric acid*

To a suitable reaction vessel, equipped as in Example 1, are added 108 parts of ω-aminocapric acid, 43 parts of KOH and 1000 parts of water. The solution is cooled to 10° C. and to this cooled solution is very slowly added a mixture of 172 parts of p-nitrophenyl propionylbromide in a solution of 43 parts of KOH and 1000 parts of water. The resulting mixture is agitated for about 4 hours at room temperature and filtered. The filtrate is acidified with 6 N HCl causing the condensation product of the capric acid and the phenylpropionylbromide to precipitate. The resulting solution is again filtered, the precipitate is collected and then recrystallized from hot water. A yield of 90% of the condensation product is recovered.

EXAMPLE 5

*Preparation of N[p-nitrophenylhexoyl]-ω-amino heptoic acid*

To a suitable reaction vessel, equipped as in Example 1, are added 111 parts of ω-aminoheptoic acid, 45 parts of KOH and 1000 parts of water. The solution is cooled to 0° C. and to this cooled solution is very slowly added a mixture of 198 parts of p-nitrophenyl hexoyl fluoride in a solution of 45 parts of KOH and 1000 parts of water. The resulting mixture is agitated for about 4 hours at room temperature and filtered. The filtrate is acidified with 6 N HCl causing the condensation product of the heptoic acid and the phenyl hexoyl fluoride to precipitate. The resulting solution is again filtered, the precipitate is collected and then recrystallized from hot water. A yield of 90% of the condensation product is recovered.

EXAMPLE 6

*Preparation of N[p-nitro benzoyl]-caprolactam*

To a suitable reaction vessel, equipped as in Example 1, are added 185 parts of p-nitro benzoyl chloride and 113 parts of caprolactam, dissolved in 600 parts of CCl$_4$. The mixture is refluxed for 15 hours and the solvent is then evaporated off. The resulting residue is washed with 300 parts of petroleum ether and is recrystallized from absolute ethanol. The above-identified condensation product was recovered in a yield of 80%.

EXAMPLE 7

*Preparation of N[p-nitro benzoyl] valerolactam*

Utilizing the procedure of Example 6 except that an equivalent amount of valerolactam is substituted for the caprolactam, a condensation product is recovered in a yield of 80%, after filtration and recrystallization from ethanol.

EXAMPLE 8

*Preparation of N[p-nitrophenyl butyroyl] caprilactam*

Utilizing the procedure of Example 6 except that an equivalent amount of caprilactam is substituted for the caprolactam and equivalent amount of p-nitrophenyl butyroyl chloride is substituted for the p-nitrobenzoyl chloride, a condensation product is recovered in a yield of 82% after filtration and recrystallization from methanol.

EXAMPLE 9

*Preparation of N[p-aminophenyl acetyl]-ω-amino valeric acid*

Into a suitable reaction vessel is charged a solution of 10 parts of N[p-nitrophenyl acetyl]-ω-amino valeric acid dissolved in 1300 parts of 95% ethanol containing 5 parts of 5% palladium on carbon catalyst. The solution is heated to a temperature of 30° C. with 100 p.s.i.g. of hydrogen pressure for 2 hours. The resultant amino compound is recovered in a yield of 96%.

EXAMPLE 10

*Preparation of N[p-aminophenyl acetyl]-ω-amino caproic acid*

To a suitable reaction vessel is added 20 parts of N[p-nitrophenyl acetyl]-ω-amino caproic acid dissolved in 1200 parts of 95% ethanol containing 5 parts of 5% palladium on carbon catalyst. The solution is heated with 100 p.s.i.g. of hydrogen for 3 hours at 30° C. Recovery of the reduced compound results in a yield of 97%.

EXAMPLE 11

*Preparation of N[p-amino benzoyl]-ω-amino caprylic acid*

Thirty-three parts of N[p-nitro benzoyl]-ω-amino caprylic acid dissolved in 10% ammonia are added to a suitable reaction vessel containing a boiling solution of 250 parts of ferrous sulfate and 300 parts of water, with stirring. The resultant mixture is made basic with concentrated ammonium hydroxide, boiled for 15 minutes and filtered. The resulting filtrate is slowly acidified with 32 parts of glacial acetic acid, causing the reduced product to precipitate. Recovery of the precipitate shows a yield of about 30%.

EXAMPLE 12

*Preparation of N[p-aminophenyl propionyl]-ω-amino capric acid*

The procedure of Example 11 was again followed except that N[p-nitrophenyl propionyl]-ω-amino capric acid is utilized as a starting material instead of N[p-nitro benzoyl]-ω-amino caprylic acid. After recovery of the reduction product, a yield of 30% was realized.

EXAMPLE 13

*Preparation of N[p-aminophenylhexoyl]-ω-aminoheptoic acid*

Utilizing the procedure of Example 9 except that N[p-nitrophenyl hexoyl]-ω-aminoheptoic acid is utilized as the starting material instead of the valeric acid compound, a 33% yield was realized upon filtration and precipitation of the solid material.

EXAMPLE 14

*Preparation of N[p-amino benzoyl] caprolactam*

Twenty parts of N[p-nitro benzoyl] caprolactam are dissolved in 1000 parts of 95% ethanol containing 5 parts of a 5% palladium on carbon catalyst and are introduced into a suitable reaction vessel. The solution is heated to a temperature of 30° C. under 100 p.s.i.g. of hydrogen pressure for 5 hours. Upon filtration of the resultant reaction mixture, 90% of the above-identified amino compound is recovered.

EXAMPLE 15

*Preparation of N[p-aminophenyl butyroyl] caprilactam*

Utilizing the procedure of Example 14 except that N[p-nitrophenyl butyroyl] caprilactam is utilized in place of the caprolactam compound, a 92% recovery of the amino caprilactam compound is recovered.

EXAMPLE 16

*Preparation of N[p-aminophentoyl] pelargonolactam*

Utilizing the procedure of Example 14 except that equivalent parts of N[p-nitrophentoyl] pelargonolactam is substituted for the N[p-nitro benzoyl] caprolactam, 88% of the desired aminopelargono lactam compound is produced.

EXAMPLE 17

*Preparation of N[p-nitro benzoyl]-ω-aminocaproic acid*

15 parts of N[p-nitro benzoyl] caprolactam are slurried in 10% by weight of a 20% aqueous solution of hydrochloric acid and refluxed for 5 hours. The reaction mixture is made alkaline with sodium hydroxide and the solid material thereby precipitates. The solid material is filtered and recrystallized from water. Approximately 32% of the desired acid compound is recovered.

EXAMPLE 18

*Preparation of N[p-aminophenyl acetyl]-ω-amino capric acid*

Utilizing the procedure of Example 17 except that equal parts of N[p-nitrophenyl acetyl] caprilactam are substituted for the benzoyl caprolactam compound, a 30% yield of N[p-nitrophenyl acetyl]-ω-amino capric acid is recovered. This ω-amino capric acid compound is then charged into a suitable reaction vessel and dissolved in a 95% ethanol solution containing 5 parts of 5% platinum on carbon catalyst. The solution is heated to a temperature of about 35° C. with 100 p.s.i.g. of hydrogen pressure for 3 hours. The resultant N[p-aminophenyl acetyl]-ω-aminocaproic acid is recovered in a yield of 93%.

EXAMPLE 19

*Homopolymerization of N[p-amino benzoyl]-ω-amino caproic acid*

25 parts of N[p-amino benzoyl]-ω-amino caproic acid are added to a suitable reaction vessel (Woods Metal Bath) and heated to a temperature of 300° C. for approximately 2 hours. At the end of this time, the polymer begins to solidify and the temperature is raised to 320° C. for additional 3 hours. A viscous polymer melting at 330° C. is recovered. The intrinsic viscosity of the polymer in concentrated $H_2SO_4$ is 0.37.

EXAMPLE 20

*Homopolymerization of N[p-aminophenyl acetyl]-ω-amino valeric acid*

To a suitable reaction vessel (Woods Metal Bath) are added 20 parts of N[p-aminophenyl acetyl]-ω-amino valeric acid. The reaction vessel is heated to 130° C. and the monomer melts and immediately forms a solid low molecular weight polymer. At a temperature of about 400° C. the polymer is still not meltable upon heating for 3 hours.

EXAMPLE 21

The polymer of Example 19 is dissolved in 98% formic acid. The polymer solids in the resultant solution is 15%. A fiber is then produced from this solution utilizing a conventional wet spinning technique. The fiber has high fiber stick and is not deformed at temperatures ranging from 250° C. to 300° C. Additionally, the fiber has excellent stability when contacted with weakly acidic media and is uneffected by common household detergents.

EXAMPLE 22

Utilizing the polymer of Example 20, a fiber is spun from a solution of 98% formic acid containing 18% polymer solids. The fiber is stable in hot and cold water and when heated to temperatures ranging from 320° C. to 350° C. When immersed in an aqueous solution of a common household detergent for 2 hours, the fiber was uneffected.

We claim:
1. An acylated lactam having the formula

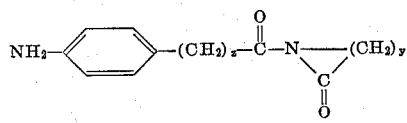

wherein $z$ is a whole positive integer from 0 to 5, inclusive and $y$ is a whole positive integer from 4 to 9, inclusive.

2. An acylated lactam having the formula

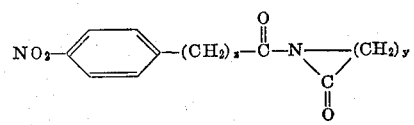

wherein $z$ is a whole positive integer from 0 to 5, inclusive and $y$ is a whole positive integer from 4 to 9, inclusive.

References Cited

UNITED STATES PATENTS 2,877,220    3/1959    O'Neill et al. _____ 260—239.3

OTHER REFERENCES

Spath et al. "Chem. Ber." vol. 68 B, pp. a221–6 (1935).

WALTER A. MODANCE, *Primary Examiner.*

JOHN D. RANDOLPH, *Examiner.*

R. T. BOND, *Assistant Examiner.*